March 15, 1927.
A. L. BLOMFIELD
ORE TREATING SYSTEM
Filed May 17, 1919
1,621,474
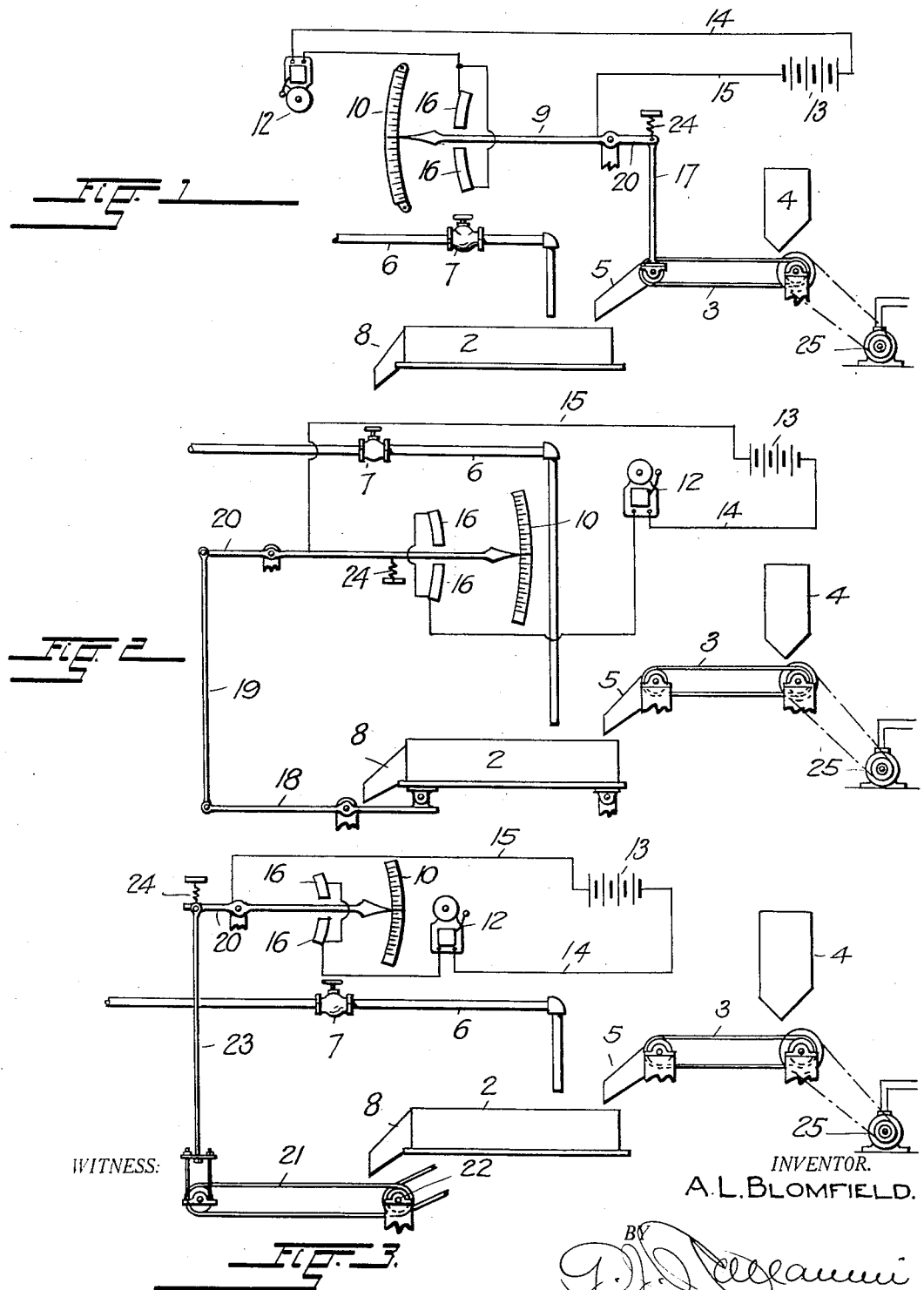

Patented Mar. 15, 1927.

1,621,474

UNITED STATES PATENT OFFICE.

ALFRED L. BLOMFIELD, OF KINGMAN, ARIZONA.

ORE-TREATING SYSTEM.

Application filed May 17, 1919. Serial No. 297,913.

This invention relates to ore treating apparatus, and its object is to provide an indicating system which operates by variation in the weight of all or part of the load of an ore-treating apparatus to give notice of irregularities in the condition of the material which detrimentally affect its treatment and are detectable by changes in the weight of a determinate part thereof.

In the accompanying drawings, I have shown my invention applied to an ore classifier, which may be of a construction shown and described in Patent No. 1,156,543 granted to David J. Nevill, October 12, 1915, but I desire it understood that it is applicable to any other apparatus in which ore or other comminuted material is treated for the recovery of its valuable constituents.

In apparatus in which the material is discharged in ratio to a continuous feed, the weight of the load by which the indicatory system is operated may be utilized at three different points in its circulating movement, namely, before it enters the apparatus, while it is being treated therein, and after it is discharged therefrom.

In the first two instances, the abnormal conditions are indicated by variations in the weight of the entire load, while in the last-mentioned instance only a part of the load is utilized for that purpose.

With these conditions in view, I have shown in the accompanying drawings, three diagrammatic representations of the system—

Figure 1 representing the system as operated by variation in the weight of material before it enters the apparatus in which it is treated;

Figure 2, the system as employed to indicate irregularities in the condition of the material while it is undergoing the treatment, and Figure 3, the system when it is actuated by variations in the weight of the product of the treatment.

Similar characters of reference designate like parts throughout the three views. The reference numeral 2 designates a classifier of conventional construction into which a comminuted material mixed with water is continuously fed through the instrumentality of an endless belt 3.

The belt receives its charge from a superposed supply-bin 4 and delivers its load into a chute 5 which discharges into the head end of the classifier. A conduit 6 connected with a conveniently located source of water-supply and controlled by a valve 7 is provided to furnish a regulatable quantity of water to the material in the classifier and a spout 8 at the tail end of the classifier, serves for the discharge of one of the classes into which the material is divided.

The system by which abnormal conditions in the material under treatment are visibly or audibly indicated, includes a pivoted pointer 9 cooperating with a graduated scale 10 and an electric-alarm 12 which is actuated by the movement of the pointer.

The pointer is to this end connected in a side of the electric circuit of the alarm, which includes a source of electricity 13 and conductors 14 and 15 connected with the opposite poles thereof.

The conductor 15 is connected with the pointer and the conductor 14 which includes the magnet windings of the alarm terminates in two contact plates 16 at opposite sides of the pointer to be engaged by a conducting part thereof during its pivotal movement in either direction.

In the operation of the system the pointer is deflected by and in ratio to variations in the weight of the material under treatment by the following methods:

Referring first to Figure 1 of the drawings in which the weight of the load before it enters the classifier is utilized to indicate irregularities in the classifying process, the endless feed-belt 3 which is operatively connected with a conveniently located motor 25, is through the medium of a link 17 suspended at one of its ends from an arm 20 of the pivoted pointer, extending opposite from its pivotal axis.

A spring 24 acting upon the same arm of the pointer compensates for the weight of the suspended feed-belt and its load under normal conditions and thus yieldingly maintains the pointer in a condition of equilibrium as long as the weight of the material carried on the belt does not vary from a definite predetermined quantity.

The material constantly falling onto the belt from the supply-bin, is carried thereby in uniform quantities and when by variations in the density of the pulp, or other causes, the weight of this load increases or decreases, the pointer by movement along the scale indicates the variation in the weight and by contact with one or the other of the contact plates 16 actuates the alarm to audibly give notice of the abnormal condition in the operation of the classifying apparatus.

The deficiency indicated by the position of the pointer on the graduated scale, is readily corrected by varying the supply of water through the conduit 6 or by changing the speed of the traveling feed belt, and the system thus operates to avoid an overload or underload of the classifier and to insure its continuous operation at or very near the point of greatest efficiency.

In the form shown in Figure 2 in which variation in the weight of the load of the classifier operates the indicating system, the classifier is pivotally mounted at one of its ends and is at its opposite end supported upon the short arm of a lever 18 whose opposite arm is by means of a link 19 connected with the arm 20 of the pivoted pointer.

When by an overload or underload or by an increase or decrease in the density of the material or by other circumstances which detrimentally affect the classifying action the weight of the load of the classifier varies from the pre-established normal, the consequent movement of the classifier about its pivotal axis actuates the indicating system as before and continues its warning action until the abnormal condition is corrected.

In the construction shown in Figure 3, one of the classes into which the material is divided by the action of the classifier is discharged through the spout 8 onto an endless belt 21 which is pivotally mounted as at 22 and which at its free end is suspended from the arm 20 of the pointer by means of a link 23.

The material discharged from the classifier, (usually the oversize) falls onto the belt which receives a uniform movement from a conveniently located motor and when the weight of the load varies from a pre-established normal the consequent movement of the lever causes the pointer to move along the scale and energize the electric alarm as hereinbefore explained.

It will thus be seen that by the use of my invention variations in the weight of the circulating load, i. e., the quantity of the material passing in a determinate period, to, through or from the classifier or other ore-treating apparatus, are automatically indicated by the pointer and the alarm which continue their indicative action until the deficiencies in the process have been corrected either by variation in the supply of water or by regulation of the movement of the feed-belt.

Having thus described my invention what I claim and desire to secure by Letters-Patent is:

1. In an ore treating system, the combination of means adapted to separate solids in materials in classes according to their weight and including a movable element, an indicator pivoted intermediate of its ends to form two arms, one of the arms being connected with the said element and actuated by the same, a scale cooperating with the other arm of the indicator, and contacts located at opposite sides of the indicator and arranged to be engaged by the latter when the indicator moves a predetermined distance in either direction from its normal position.

2. In an ore treating system, the combination of an element adapted to separate solids in materials in classes according to their settling rates, means for yieldably supporting the load and an appliance for indicating the condition of the load subjected to the classifying action, by variations of weight in the load.

3. In an ore treating system, the combination of an element adapted to separate solids in materials in classes according to their settling rates, means for yieldably supporting the load said element being mounted to move by variations of weight in the load and an indicatory appliance connected with said element and operated by the said variations.

4. In an ore treating system, the combination of an element adapted to separate solids in materials in classes according to their settling rates, means for yieldably supporting the load said element being pivotally mounted to move bodily upwardly and downwardly by variations of weight in the load, and an appliance operated by said variations for indicating the condition of the material subjected to the classifying action.

5. In an ore treating system, the combination of a classifier pivotally mounted to move bodily upwardly and downwardly by variations in the weight of the over size of the material divided by the classifier, an indicator pivoted intermediate of its ends to form two arms, one of the arms being connected with the classifier, a scale cooperating with the other arm of the indicator, and contacts located at opposite sides of the indicator and arranged to be engaged by the same when the said indicator has moved a predetermined distance in either direction of its normal position.

In testimony whereof I have affixed my signature.

ALFRED L. BLOMFIELD.